(12) United States Patent
Kfir et al.

(10) Patent No.: US 11,277,346 B2
(45) Date of Patent: *Mar. 15, 2022

(54) METHOD AND APPARATUS FOR OFFLOADING PACKET CLASSIFICATION PROCESSING OF AN ACCESS POINT IN A RESIDENTIAL GATEWAY

(71) Applicant: Intel Corporation, Santa Clara, CA (US)

(72) Inventors: Ziv Kfir, Yavne (IL); Barak Hermesh, Pardes Hana (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,412

(22) Filed: Dec. 23, 2019

(65) Prior Publication Data
US 2020/0195565 A1    Jun. 18, 2020

Related U.S. Application Data

(63) Continuation of application No. 15/986,845, filed on May 23, 2018, now Pat. No. 10,530,698.
(Continued)

(51) Int. Cl.
| | |
|---|---|
| *H04L 12/851* | (2013.01) |
| *H04L 12/28* | (2006.01) |
| *H04W 88/08* | (2009.01) |
| *H04W 84/12* | (2009.01) |
| *H04L 47/2441* | (2022.01) |

(52) U.S. Cl.
CPC ...... *H04L 47/2441* (2013.01); *H04L 12/2898* (2013.01); *H04W 84/12* (2013.01); *H04W 88/08* (2013.01)

(58) Field of Classification Search
CPC .......... H04L 47/2441; H04L 12/2898; H04W 88/08; H04W 84/12
See application file for complete search history.

(56) References Cited

U.S. PATENT DOCUMENTS

| | | | |
|---|---|---|---|
| 2004/0006602 A1* | 1/2004 | Bess | H04L 67/142 709/207 |
| 2004/0039940 A1* | 2/2004 | Cox | H04L 29/06 709/224 |

(Continued)

*Primary Examiner* — Mohammad S Anwar
(74) *Attorney, Agent, or Firm* — 2SPL Patent Attorneys PartG mbB; Yong Beom Hwang (57) ABSTRACT

A method and apparatus for offloading packet classification processing of an access point in a residential gateway. A residential gateway includes a wireless access point and a processing circuit. The processing circuit receives a data packet from a network via a network port, processes the data packet to obtain packet classification information for the data packet, and sends the data packet with the packet classification information to the access point. The access point may process the data packet based on the packet classification information received from the processing circuit. The packet classification information includes at least one of a basic service set identifier, a station identifier, and an access category. The processing circuit may include a packet accelerator. The packet accelerator may write a cookie including the packet classification information in a packet descriptor for the data packet.

20 Claims, 6 Drawing Sheets

Related U.S. Application Data (60) Provisional application No. 62/552,495, filed on Aug. 31, 2017.

(56) References Cited

U.S. PATENT DOCUMENTS

| | | | | |
|---|---|---|---|---|
| 2004/0192221 A1* | 9/2004 | Matsunaga | H04W 36/30 | 455/76 |
| 2006/0242313 A1* | 10/2006 | Le | H04L 69/22 | 709/230 |
| 2007/0008967 A1* | 1/2007 | Bressler | H04L 47/15 | 370/390 |
| 2009/0080374 A1* | 3/2009 | Lee | H04L 47/70 | 370/328 |
| 2010/0124223 A1* | 5/2010 | Gibbs | H04W 12/12 | 370/389 |
| 2011/0038317 A1* | 2/2011 | Nuno | H04W 52/0225 | 370/328 |
| 2011/0134826 A1* | 6/2011 | Yang | H04W 76/12 | 370/315 |
| 2016/0006661 A1* | 1/2016 | Wei | H04W 52/0222 | 370/230 |

\* cited by examiner

METHOD AND APPARATUS FOR OFFLOADING PACKET CLASSIFICATION PROCESSING OF AN ACCESS POINT IN A RESIDENTIAL GATEWAY

CROSS REFERENCE TO RELATED APPLICATIONS

This application is a continuation of U.S. application Ser. No. 15/986,845 filed on May 23, 2018, which claimed priority under 35 U.S.C. § 119(e) to U.S. Provisional App. No. 62/552,495 filed on Aug. 31, 2017. The contents of the earlier filed applications are incorporated by reference herein in their entirety.

FIELD

Examples relate to a residential gateway, more particularly, a method and apparatus for offloading packet classification processing of an access point in a residential gateway.

BACKGROUND

Network operators (e.g. multiple systems operators (MSOs)) have deployed a network (e.g. a co-axial network, a hybrid fiber-coaxial (HFC) network, a digital subscriber line (DSL) network, etc.) to provide TV, video and audio broadcast services, interactive video services, high-speed data services including Internet services, and the like to their subscribers. In the customer premises, a residential gateway (e.g. a home gateway, a cable modem, etc.) is installed to receive the services provided by the network operators. A residential gateway allows a connection of a local area network (LAN) to a wide area network (WAN) and may provide functionalities of a modem.

Residential gateways may include a hardware accelerator for packet forwarding as well as a wireless LAN (WLAN) access point (AP) for providing wireless accesses to user equipments, such as a mobile phone, a laptop computer, etc. The growth in bandwidth and the introduction of Internet of Things (IOT) bring some challenges with respect to the processing loads on the AP in the residential gateway. It is expected that the average packet size will become smaller while the overall throughput becomes higher, resulting in much greater packet-per-second (PPS) rates having to be processed at the AP. Therefore, there is a need to relieve the processing load on the WLAN AP in the residential gateway.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
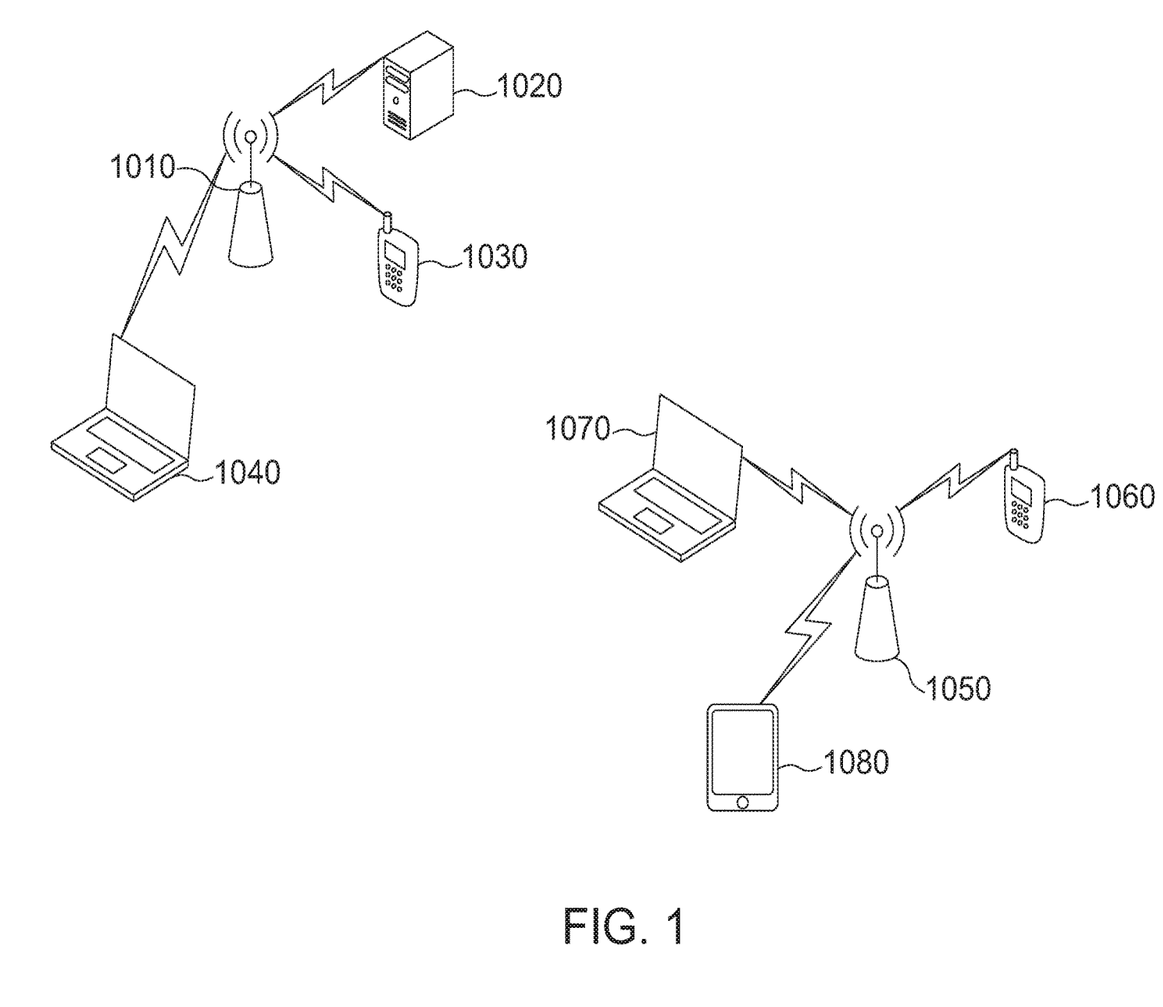
FIG. 1 shows a schematic of wireless networks according to some examples of the present disclosure.

FIG. 1 shows a schematic of wireless networks according to some examples of the present disclosure. A wireless network is supported by an AP 1010, 1050. An AP 1010, 1050 communicates with one or more wireless stations (STA) 1020-1040, 1060-1080. The station (e.g. a user equipment) may be a laptop, a smartphone, a computing device, a tablet, or any type of user device capable of wireless communication. Example wireless networks include Wireless Fidelity (Wi-Fi) networks operating according to an Institute for Electrical and Electronics Engineers (IEEE) 802.11 standards (e.g., an 802.11ac standard). A first network provided by an AP 1010 and a second network provided by an AP 1050 may overlap such that one or more devices 1010-1040 in the first network may receive transmissions from one or more of devices 1050-1080 in the second network and one or more of devices 1050-1080 in the second network may receive transmissions from one or more of devices 1010-1040 in the first network.

Figure 2:
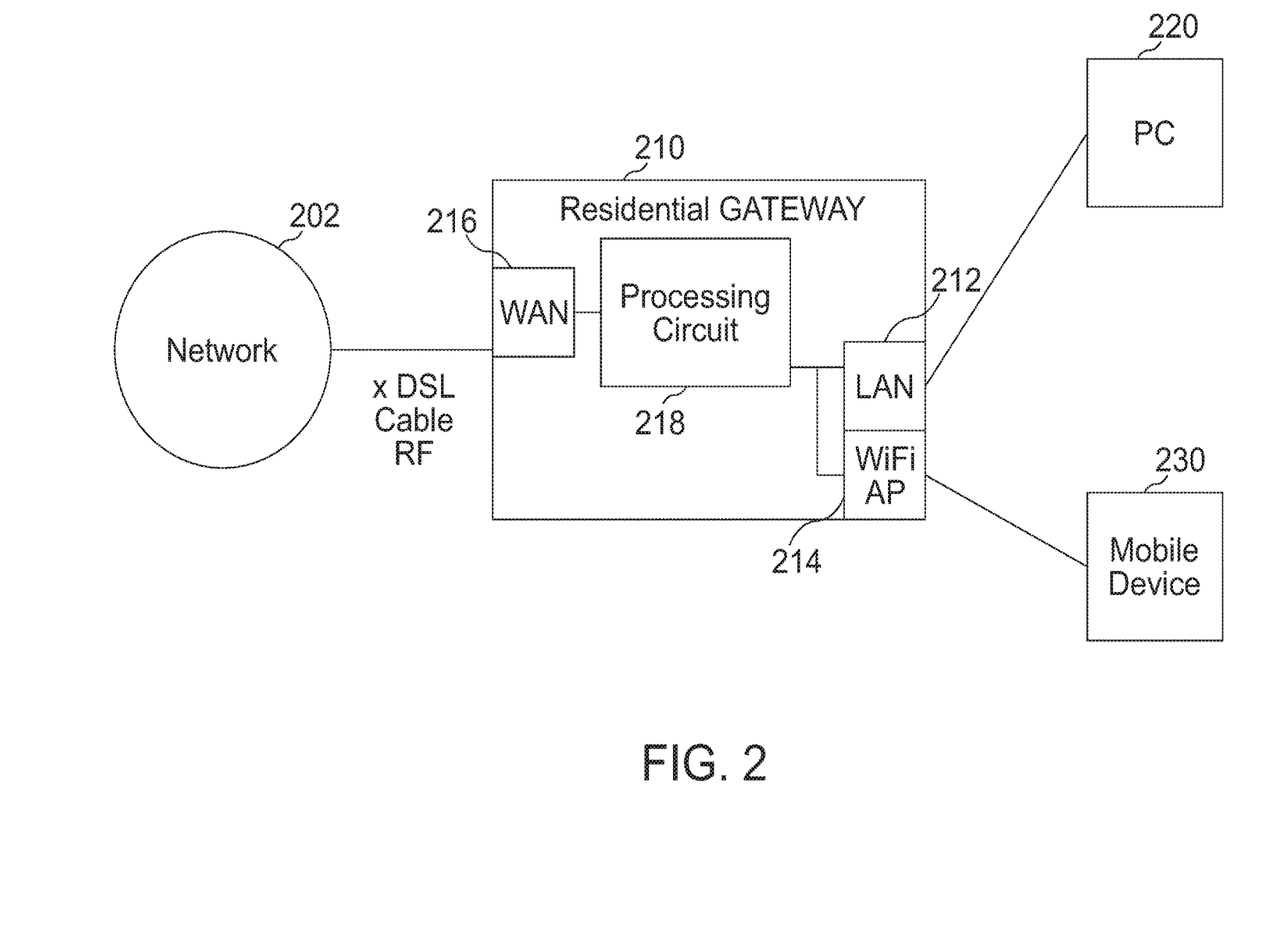
FIG. 2 shows a schematic illustration of a residential gateway according to an example.

FIG. 2 shows a schematic illustration of a residential gateway according to an example. The residential gateway 210 may be referred to as a home gateway, a cable modem, or any device that may connect a user device (e.g. a station) to a network such as Internet. The residential gateway 210 comprises a WAN module 216 (e.g. comprising a WAN port and a WAN transceiver circuit), which is able to connect the residential gateway 210 to a network 202 (e.g. by an xDSL connection, a cable connection, a radio frequency (RF) connection, etc.). The residential gateway 210 includes a WiFi circuit 214 (e.g. an AP circuit) configured to enable a wireless data exchange with one or more other devices 230 (e.g. mobile device as a cell phone, a laptop, etc.). The residential gateway 210 may include a LAN circuit 212 (e.g. comprising a LAN port and an LAN transceiver circuit, such as Ethernet circuit) to enable a wired data exchange with one or more other devices 220 (e.g. a personal computer, a laptop, etc.).

Examples are provided to offload at least a part of packet processing load (e.g. packet classification) performed at the AP 214 in the residential gateway 210 to a hardware accelerator (e.g. a packet forwarding engine) in the residential gateway 210 by taking advantage of packet classification processing done as a part of the processing performed by the hardware accelerator.

The transmit flow of an AP 214 includes packet classification of an incoming data packet for the purposes of finding a basic service set identifier (BSSID), a station ID, a WiFi multi-media (WMM) access category, etc. The AP 214 in the residential gateway 210 may be implemented as a self-contained standalone device. In such case, the AP 214 may perform the packet classifications independently. However, due to a cost reason, the AP 214 included in the residential gateway 210 may have limited capabilities, including limited PPS capabilities, simplistic parsing and limited look-up, etc. In contrast, the residential gateway 210 may include a better processing power including a hardware accelerator. In addition, the residential gateway 210 would perform the packet classification anyway for other purposes (e.g. implementing a firewall, etc.).

In some examples, the packet classification process performed by the AP 214 may be offloaded to a hardware accelerator in the residential gateway 210 such that the hardware accelerator in the residential gateway 210 classifies the packets and the digested information (i.e. the packet classification information) obtained by the hardware accelerator is transferred to the AP 214, and the AP 214 may simply use the information (e.g. a 32-bit cookie) provided by the hardware accelerator instead of performing the packet classification processing. The packet classification information provided by the hardware accelerator to the AP 214 may include at least one of a BSSID, a station ID, or an access category. Additional information may also be provided from the hardware accelerator to the AP.

With this scheme, the need for an AP 214 in a residential gateway 210 to classify the incoming packets may be eliminated and the AP 214 may avoid the intensive computing process involved with the packet classification. Instead, the AP 214 can obtain all the information needed for classifying the incoming packets, for example, with one simple look-up (e.g. retrieving a cookie). In accordance with the examples disclosed herein, the AP 214 can save a lot of processing power and the whole system would run more efficiently with higher PPS and may be more flexible.

Figure 3:
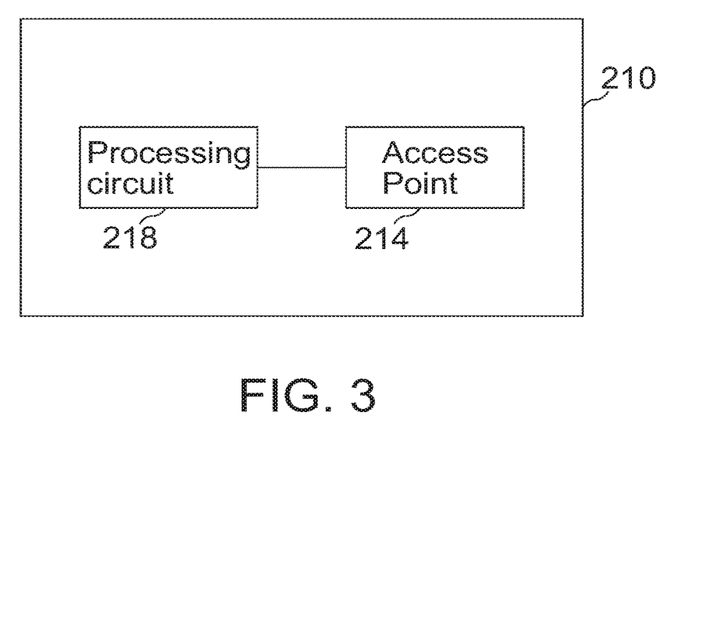
FIG. 3 is a schematic diagram of an example residential gateway for providing network connectivity to a station(s)

FIG. 3 is a schematic diagram of an example residential gateway 210 for providing network connectivity to a station (s). The residential gateway 210 may include a processing circuit 218 and an AP 214. The AP 214 may be a standalone device attached to the residential gateway 210. The AP 214 may serve one or more basic service sets (BSSs) and is configured to provide a wireless connectivity to one or more stations (e.g. user equipment). The processing circuit 218 is configured to receive a data packet from a network via a network port (e.g. a WAN port), process the data packet to obtain packet classification information for the data packet, and send the data packet with the packet classification information to the AP 214. The AP 214 may process the data packet based on the packet classification information received from the processing circuit 218 without performing a packet classification process.

Figure 4:
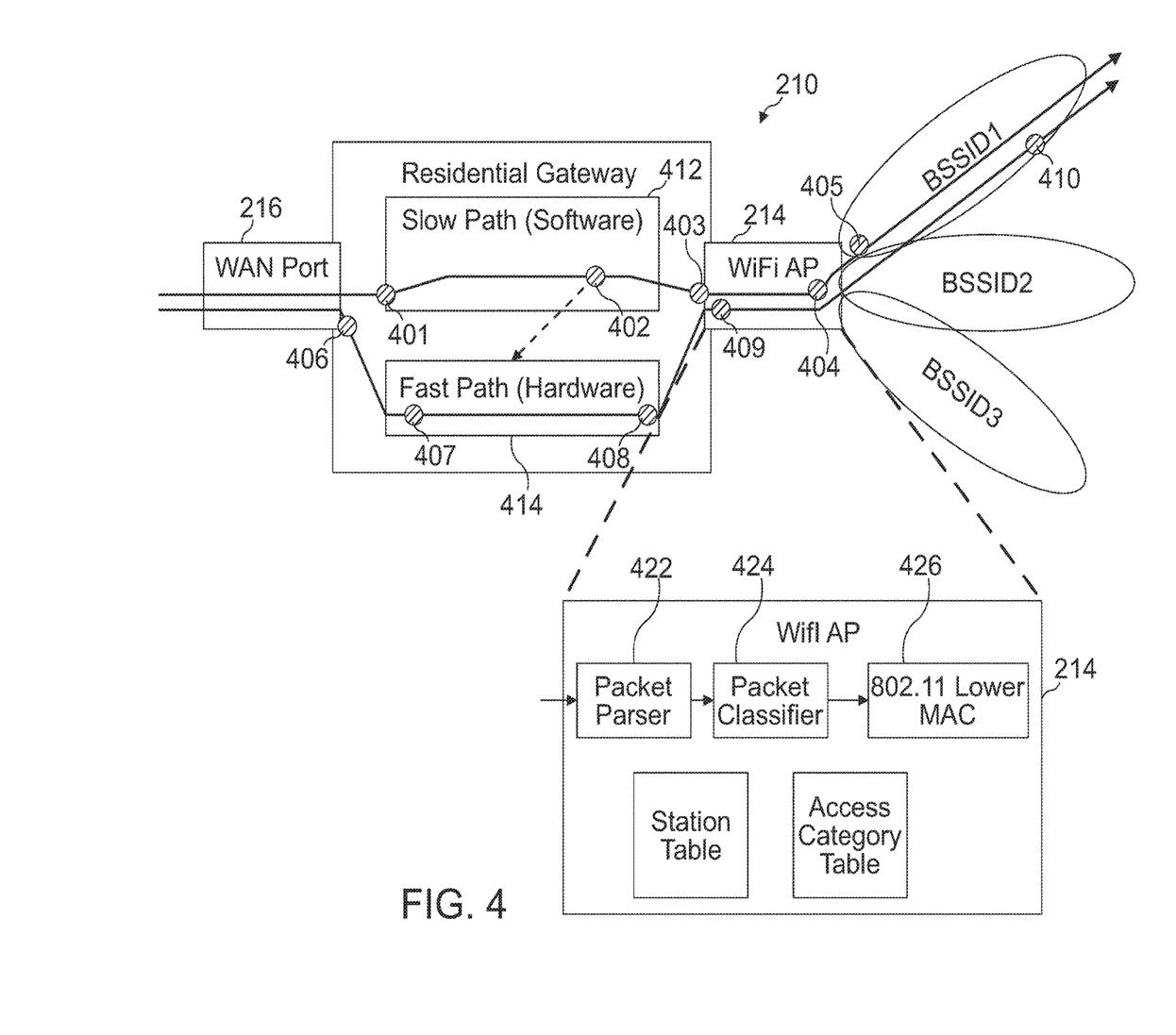
FIG. 4 shows a structure of an example residential gateway along with an example data flow in the residential gateway.

FIG. 4 shows a structure of an example residential gateway 210 along with an example data flow in the residential gateway 210. The residential gateway 210 allows a connection of a LAN to a WAN such as Internet. The residential gateway 210 receives a flow of data packets from a network via a WAN port 216 and processes and forwards the received data packets to an appropriate output, such as to a LAN port 212 or to the AP 214. The AP 214 sends the data packets to a station on an appropriate BSS.

The AP 214 is a wireless networking device that allows a station (e.g. a user equipment) to connect to a network via a wireless link. The AP 214 may be functionally separate and independent from the rest of the residential gateway 210. The AP 214 may serve one or more BSSs. Each of the basic service sets is identified by a BSSID, which is a 48-bit identifier.

The residential gateway 210 may include two processing paths (i.e. processing circuits) for processing incoming data packets: a software-based processing path 412 and a hardware-based processing path 414. The software-based processing path 412 is implemented by a packet processing software running on a processor (i.e. a host processor of the residential gateway 210). The hardware-based processing path 414 may be implemented with a hardware accelerator that is specifically designed for processing the incoming packets. The hardware accelerator may be referred to as a packet forwarding accelerator or a packet forwarding engine and can be implemented by an application specific integrated circuit (ASIC).

A data packet belonging to a new flow arrives from a network at the WAN port 216 of the residential gateway 210 (401). Since it is a new flow of packet, the hardware-based processing path 414 may not yet be set up for processing the new packet, and the new packet may be initially processed by the software-based processing path 412.

The software-based processing path 412 (i.e. a control software) may program the hardware-based processing path 414 for processing the new flow of packets (402). In order to program the hardware-based processing path 414, the incoming packet may be parsed and fields of the packet may be extracted from the packet, as done by the AP 214, and then the software-based processing path 412 may program the hardware-based processing path 414 with a flow classification rule, a modification action, and a forwarding rule, etc. The software-based processing path 412 may have a WiFi software module to perform the packet classification process as performed at the AP 214. The software-based processing path 412 may receive a copy of the WiFi software module including the classification rules from the AP 214 to mimic the packet classification process. The software-based processing path 412 may parse the incoming packet, examine the parsed packet, and apply the classification rules. The software-based processing path 412 obtains packet classification information including at least one of a BSSID, a station ID, and an access category, etc. from the packet after parsing and analyzing the packet and program the hardware-based processing path 414 to perform the same processing on subsequent data packets belonging to the same flow.

The software-based processing path 412 then pushes the packet to the AP 214 (403). The AP 214 may include a packet parser 422, a packet classifier 424, and a medium access control (MAC) entity 426. In case, the packet classification information of the packet is not provided to the AP 214, the packet parser 422 may parse the received packet into fields, and the packet classifier 424 may classify the packet based on a BSSID, a station ID, and an access category. Alternatively, the AP 214 may not include the packet parser 422 and the packet classifier 424, and may rely on the packet classification information provided by the software-based processing path 412 or the hardware-based processing path 414. The AP 214 processes the received packet (404), and then transmits the packet to a station based on the BSSID, the station ID, and/or the access category (405).

A subsequent packet(s) of the same data flow arrives at the WAN port 214 (406). Since the hardware-based processing path 414 has been set up for the data flow, the subsequent packet(s) is classified as belonging to an existing accelerated flow and is forwarded to the hardware-based processing path 414 (407). After processed by the hardware-based processing path 414 the packet classification information (e.g. the BSSID, the station ID, and/or the access category, etc.) for the packet is obtained (408), the packet is pushed to the AP 214 along with the packet classification information (409). The AP 214 transmits the packet to a station based on the packet classification information received from the hardware-based processing path 414 (410).

Figure 5:
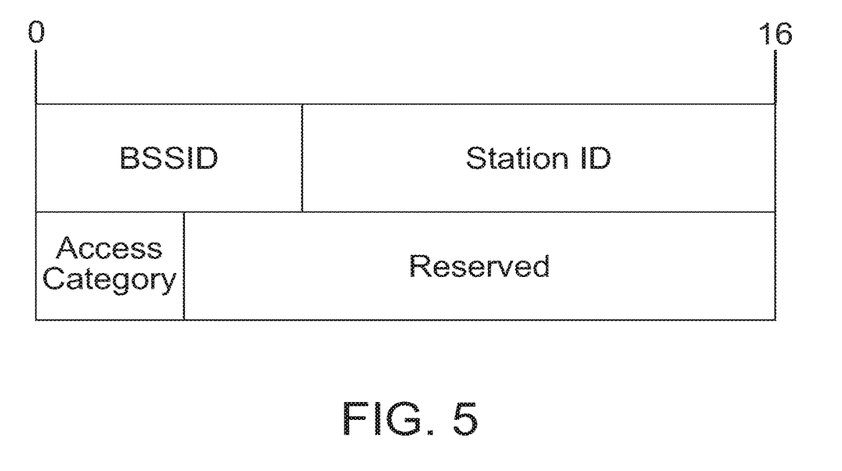
FIG. 5 shows an example encoding of a WiFi cookie.

The classification information may be encoded (by the software-based processing path 412 or the hardware-based processing path 414) into a single field, (e.g. a 32-bit field) that may be called "WiFi cookie." FIG. 5 shows an example encoding of the WiFi cookie with 6 bits for the BSSID index, 10 bits for the station ID index, 3 bits for the access category, and 13 reserved bits. The hardware-based processing path 424 may be programmed to generate the WiFi cookie as part of the flow information.

All subsequent data packets of the same flow may go through the hardware-based processing path 414. All packets belonging to the same flow may get the same modification actions by the hardware-based processing path 414 such that a WiFi cookie is generated for each incoming packet. In some examples, the WiFi cookie for the packet may be written into the packet descriptor. The 32-bit field including the packet classification information may be added in the packet descriptor.

Figure 6:
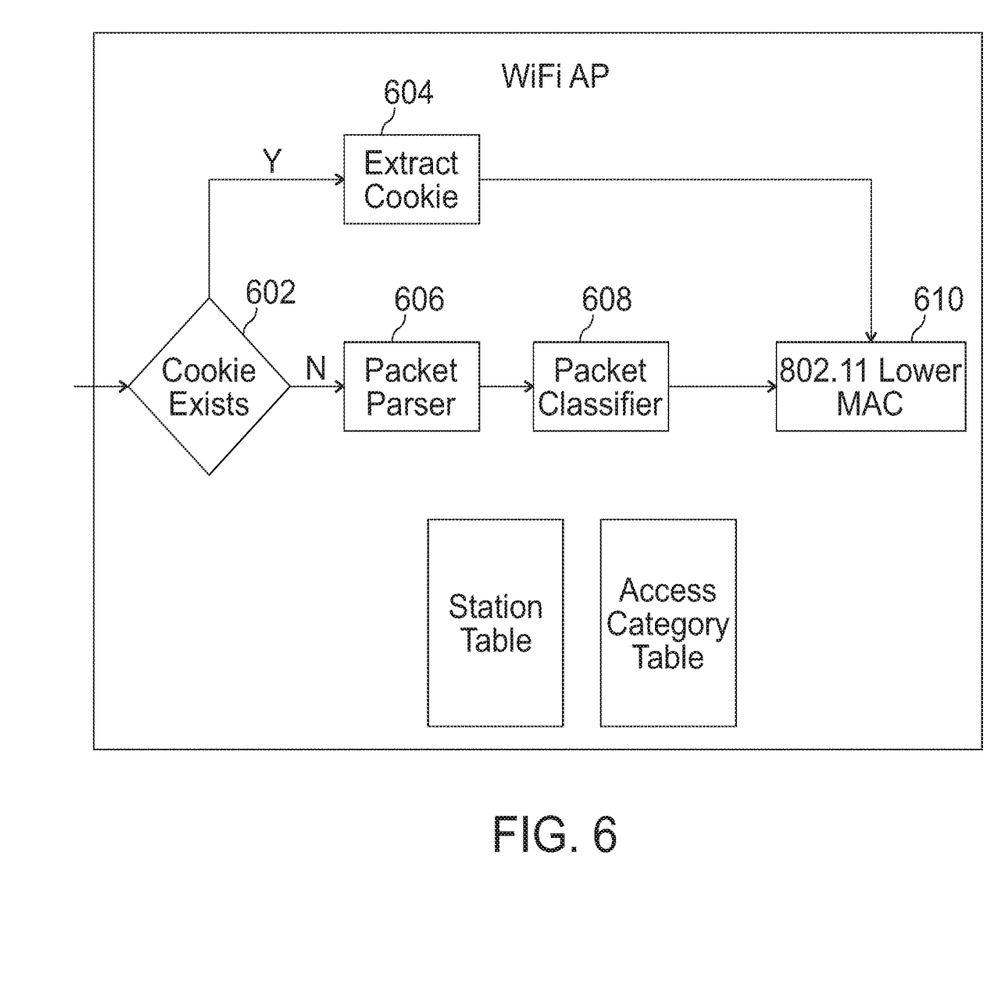
FIG. 6 shows an example process performed at the AP.

FIG. 6 shows an example packet processing process performed at the AP 214. When an AP 214 receives a data packet, the AP 214 may look for a WiFi cookie for the data packet in a packet descriptor (602). If a WiFi cookie exists, the AP 214 extracts the WiFi cookie and obtains the packet classification information (e.g. the BSSID, the station ID, the access category, and/or any other information) from the WiFi cookie (604). The AP 214 then proceeds directly to the medium access control (MAC) processing without packet classification processing (610). If a WiFi cookie does not exist, the AP 214 may parse the data packet to fields (606), and apply a packet classifier to obtain the packet classification information (608), and then performs the MAC processing (610). If the AP 214 does not include a packet parser and a packet classifier, the AP 214 relies on the packet classification information provided by the hardware-based processing path (or the software-based processing path). Extracting a cookie is a much faster operation compared to the alternative path of parsing the packet, extracting the fields, and applying them to the packet classifier. In accordance with the examples disclosed herein, the processing load on the AP 214 may be lowered and the packet processing may be performed more efficiently.

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

Figure 7:
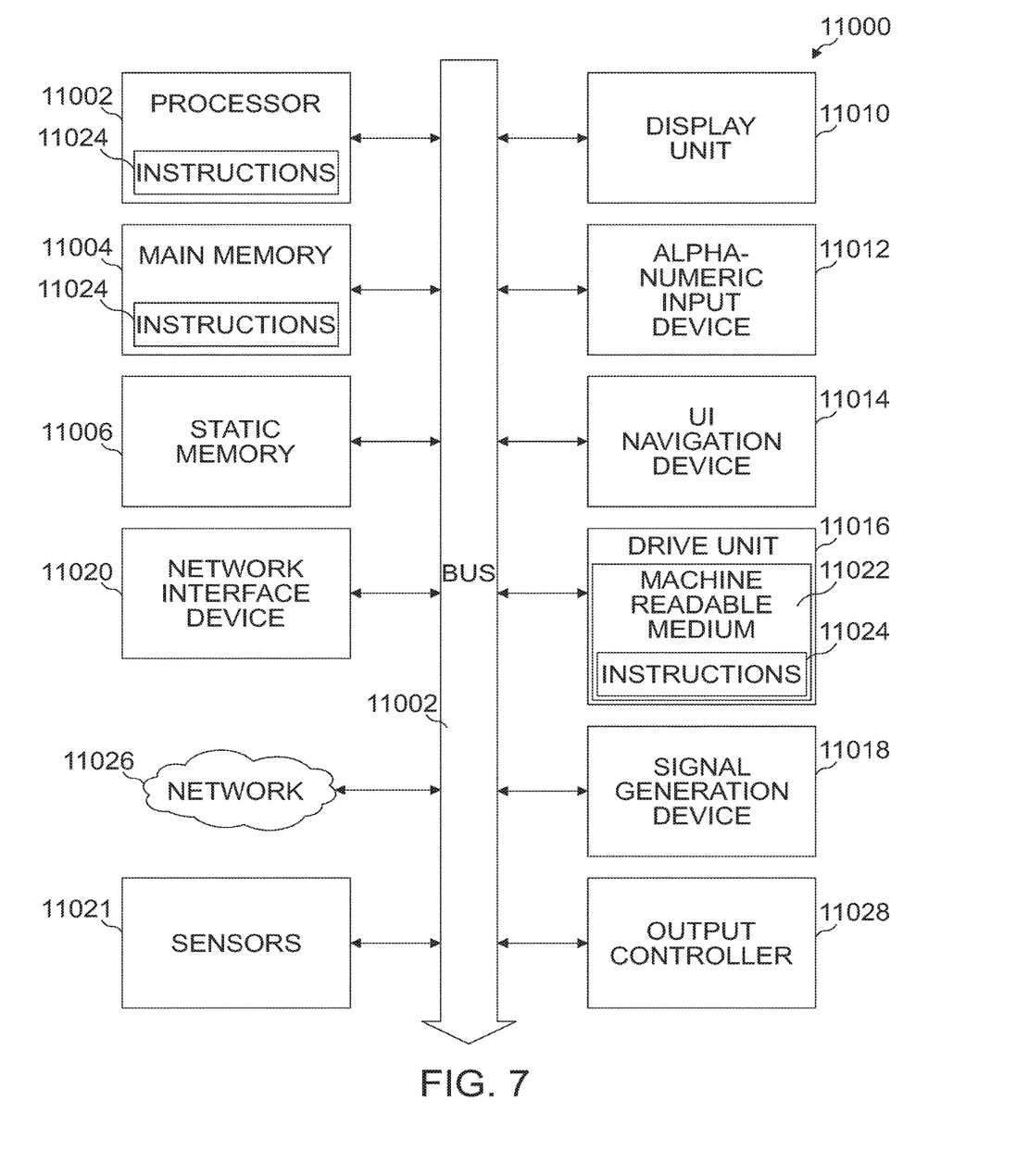
FIG. 7 shows a block diagram of an example machine upon which any one or more of the techniques discussed herein may be performed.

FIG. 7 shows a block diagram of an example machine 11000 upon which any one or more of the techniques (e.g., methods) discussed herein may be performed. In alternative embodiments, the machine 11000 may operate as a standalone device or may be connected (e.g., networked) to other machines. In a networked deployment, the machine 11000 may operate in the capacity of a server machine, a client machine, or both in server-client network environments. In an example, the machine 11000 may act as a peer machine in peer-to-peer (P2P) (or other distributed) network environment. The machine 11000 may be a personal computer (PC), a tablet PC, a set-top box (STB), a personal digital assistant (PDA), a mobile telephone, a web appliance, a network router, switch or bridge, an Access Point (AP), a Station (STA), and/or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 11000 may include a hardware processor 11002 (e.g., a central processing unit (CPU), a graphics processing unit (GPU), a hardware processor core, or any combination thereof), a main memory 11004 and a static memory 11006, some or all of which may communicate with each other via an interlink (e.g., bus) 11008. The machine 11000 may further include a display unit 11010, an alphanumeric input device 11012 (e.g., a keyboard), and a user interface (UI) navigation device 11014 (e.g., a mouse). In an example, the display unit 11010, input device 11012 and UI navigation device 11014 may be a touch screen display. The machine 11000 may additionally include a storage device (e.g., drive unit) 11016, a signal generation device 11018 (e.g., a speaker), a network interface device 11020, and/or one or more sensors 11021, such as a global positioning system (GPS) sensor, compass, accelerometer, or other sensor. The machine 11000 may include an output controller 11028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 11016 may include a machine readable medium 11022 on which is stored one or more sets of data structures or instructions 11024 (e.g., software) embodying or utilized by any one or more of the techniques or functions described herein. The instructions 11024 may also reside, completely or at least partially, within the main memory 11004, within static memory 11006, or within the hardware processor 11002 during execution thereof by the machine 11000. In an example, one or any combination of the hardware processor 11002, the main memory 11004, the static memory 11006, or the storage device 11016 may constitute machine readable media.

While the machine readable medium 11022 is illustrated as a single medium, the term "machine-readable medium" may include a single medium or multiple media (e.g., a centralized or distributed database, and/or associated caches and servers) configured to store the one or more instructions 11024.

The term "machine-readable medium" may include any medium that is capable of storing, encoding, or carrying instructions for execution by the machine 11000 and that cause the machine 11000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 11024 may further be transmitted or received over a communications network 11026 using a transmission medium via the network interface device 11020. The Machine 11000 may communicate with one or more other machines using one or more networks. Machine 11000 may utilize any one or more of a number of communication and network protocols implemented in some examples by one or more of the components of machine 11000 including the network interface device 11020. Examples include a frame relay, internet protocol (IP), transmission control protocol (TCP), user datagram protocol (UDP), hypertext transfer protocol (HTTP), protocols relating to local area networks (LAN), wide area networks (WAN), packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 80215.4 family of standards, a Long Term Evolution (LTE) family of standards, a Universal Mobile Telecommunications System (UMTS) family of standards, peer-to-peer (P2P) networks, among others. In an example, the network interface device 11020 may include one or more physical jacks (e.g., Ethernet, coaxial, or phone jacks) or one or more antennas to connect to the communications network 11026. In an example, the network interface device 11020 may include a plurality of antennas to wirelessly communicate using at least one of single-input multiple-output (SIMO), multiple-input multiple-output (MIMO), or multiple-input single-output (MISO) techniques. In some examples, the network interface device 11020 and/or other components of machine 11000 may wirelessly communicate using Multiple User MIMO techniques. Network interface device 11020 and/or other components of machine 11000 may modulate and demodulate packets utilizing Orthogonal Frequency Division Multiplexing (OFDM) techniques and may implement one or more network protocol layers such as a Medium Access Control layer (MAC layer) a Physical Layer (PHY) and the like.

The examples as described herein may be summarized as follows:

Example 1 is a residential gateway comprising an access point configured to provide a wireless connectivity to a user equipment, and a processing circuit configured to receive a data packet from a network via a network port, process the data packet to obtain packet classification information for the data packet, and send the data packet with the packet classification information to the access point. The access point is configured to process the data packet based on the packet classification information received from the processing circuit.

Example 2 is the residential gateway of example 1, wherein the packet classification information includes at least one of a basic service set identifier, a station identifier, and an access category.

Example 3 is the residential gateway of example 1, wherein the processing circuit includes a hardware-based packet accelerator configured to process the data packet to obtain the packet classification information for the data packet and send the data packet with the packet classification information to the access point.

Example 4 is the residential gateway of example 3, wherein the processing circuit includes a software-based process path configured to program the hardware-based packet accelerator based on packet classification rules that are applied by the access point.

Example 5 is the residential gateway of example 4, wherein the hardware-based packet accelerator is configured to write a cookie including the packet classification information in a packet descriptor for the data packet.

Example 6 is the residential gateway of example 5, wherein the access point is configured to determine whether a cookie exists in the packet descriptor for the data packet, and if the cookie exists, extract the cookie from the packet descriptor, and process the data packet based on information extracted from the cookie.

Example 7 is the residential gateway of example 6, wherein the access point is configured to, if the access point determines that the cookie does not exist in the packet descriptor for the data packet, parse the data packet, extract fields from the data packet, and apply the extracted fields to a packet classifier to obtain the packet classification information.

Example 8 is the residential gateway of example 1, wherein the access point is a standalone device.

Example 9 is a method for offloading packet classification process of an access point in a residential gateway. The method includes receiving a data packet from a network via a network port, processing the data packet to obtain packet classification information for the data packet, sending the data packet with the packet classification information to an access point in the residential gateway, and sending the data packet from the access point to a user equipment based on the packet classification information.

Example 10 is the method of example 9, wherein the packet classification information includes at least one of a basic service set identifier, a station identifier, and an access category.

Example 11 is the method of example 9, wherein the data packet is processed by a hardware-based packet accelerator configured to process the data packet to obtain the packet classification information for the data packet and send the data packet with the packet classification information to the access point.

Example 12 is the method of example 11, further including programming the hardware-based packet accelerator based on packet classification rules that are applied at the access point.

Example 13 is the method of example 11, further including writing, by the hardware-based packet accelerator, a cookie including the packet classification information in a packet descriptor for the data packet.

Example 14 is the method of example 13, further including determining, by the access point, whether a cookie exists in the packet descriptor for the data packet, extracting, by the access point, the cookie from the packet descriptor if the cookie exists, and processing, by the access point, the data packet based on information extracted from the cookie.

Example 15 is the method of example 14, further including parsing, by the access point, the data packet if the access point determines that the cookie does not exist in the packet descriptor for the data packet, extracting, by the access point, fields from the data packet, and applying, by the access point, the extracted fields to a packet classifier to obtain the packet classification information.

Example 16 is the method of example 9, wherein the access point is a standalone device.

Example 17 is a non-transitory computer-readable storage medium comprising executable instructions, when executed, to implement a method as in any one of examples 9-16.

Example 18 is an apparatus comprising an access point configured to provide a wireless connectivity to a user equipment, a means for receiving a data packet from a network via a network port, a means for processing the data packet to obtain packet classification information for the data packet, and a means for sending the data packet with the packet classification information to the access point. The access point is configured to process the data packet based on the packet classification information received from the receiving means.

Example 19 is the apparatus of example 18, wherein the packet classification information includes at least one of a basic service set identifier, a station identifier, and an access category.

Example 20 is the apparatus of example 18, wherein the means for processing includes a hardware-based packet accelerator configured to process the data packet to obtain the packet classification information for the data packet and send the data packet with the packet classification information to the access point.

Example 21 is the apparatus of example 20, wherein the means for processing includes a software-based process path configured to program the hardware-based packet accelerator based on packet classification rules that are applied by the access point.

Example 22 is the apparatus of example 21, wherein the hardware-based packet accelerator is configured to write a cookie including the packet classification information in a packet descriptor for the data packet.

Example 23 is the apparatus of example 22, wherein the access point is configured to determine whether a cookie exists in the packet descriptor for the data packet, and if the cookie exists, extract the cookie from the packet descriptor, and process the data packet based on information extracted from the cookie.

Example 24 is the apparatus of example 23, wherein the access point is configured to, if the access point determines that the cookie does not exist in the packet descriptor for the data packet, parse the data packet, extract fields from the data packet, and apply the extracted fields to a packet classifier to obtain the packet classification information.

Example 25 is the apparatus of example 18, wherein the access point is a standalone device.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A gateway, comprising:
   an access point configured to provide a wireless connectivity to a user equipment; and
   a processing circuit configured to receive a data packet from a network via a network port, process the data packet to obtain packet classification information for the data packet, and send the data packet with the packet classification information to the access point,
   wherein the access point is configured to process the data packet based on the packet classification information received from the processing circuit.

2. The gateway of claim 1, wherein the processing circuit includes a hardware-based packet accelerator configured to process the data packet to obtain the packet classification information for the data packet based on packet classification rules provided by the access point and send the data packet with the packet classification information to the access point.

3. The gateway of claim 2, wherein the processing circuit includes a software-based process path configured to program the hardware-based packet accelerator based on the packet classification rules that are applied by the access point.

4. The gateway of claim 2, wherein the hardware-based packet accelerator is configured to write a cookie including the packet classification information in a packet descriptor for the data packet.

5. The gateway of claim 4, wherein the access point is configured to determine whether a cookie exists in the packet descriptor for the data packet, and if the cookie exists, extract the cookie from the packet descriptor, and process the data packet based on information extracted from the cookie.

6. The gateway of claim 5, wherein the access point is configured to, if the access point determines that the cookie does not exist in the packet descriptor for the data packet, parse the data packet, extract fields from the data packet, and apply the extracted fields to a packet classifier to obtain the packet classification information.

7. The gateway of claim 1, wherein the data packet is sent to the user equipment.

8. The gateway of claim 7, wherein the user equipment is one of a mobile phone, a laptop computer, a smartphone, a computing device, a tablet computer, a set-top box, or a personal data assistant.

9. The gateway of claim 1, wherein the packet classification information includes at least one of a basic service set identifier, a station identifier, and an access category.

10. A user equipment that receives a data packet from a gateway of claim 1.

11. The user equipment of claim 10, wherein the user equipment is one of a mobile phone, a laptop computer, a smartphone, a computing device, a tablet computer, a set-top box, or a personal data assistant.

12. A method for offloading packet classification process of an access point in a gateway, the method comprising:
   receiving, by a processing circuit in the gateway, a data packet from a network via a network port;

processing, by the processing circuit, the data packet to obtain packet classification information for the data packet;

sending, by the processing circuit, the data packet with the packet classification information to an access point; and processing, by the access point, the data packet based on the packet classification information received from the processing circuit.

13. The method of claim 12, wherein the processing circuit includes a hardware-based packet accelerator configured to process the data packet to obtain the packet classification information for the data packet based on packet classification rules provided by the access point and send the data packet with the packet classification information to the access point.

14. The method of claim 13, wherein the processing circuit includes a software-based process path configured to program the hardware-based packet accelerator based on the packet classification rules that are applied by the access point.

15. The method of claim 13, wherein the hardware-based packet accelerator is configured to write a cookie including the packet classification information in a packet descriptor for the data packet.

16. The method of claim 15, wherein the access point is configured to determine whether a cookie exists in the packet descriptor for the data packet, and if the cookie exists, extract the cookie from the packet descriptor, and process the data packet based on information extracted from the cookie.

17. The method of claim 16, wherein the access point is configured to, if the access point determines that the cookie does not exist in the packet descriptor for the data packet, parse the data packet, extract fields from the data packet, and apply the extracted fields to a packet classifier to obtain the packet classification information.

18. The method of claim 12, further comprising:
sending the data packet to a user equipment.

19. The method of claim 18, wherein the user equipment is one of a mobile phone, a laptop computer, a smartphone, a computing device, a tablet computer, a set-top box, or a personal data assistant.

20. The method of claim 12, wherein the packet classification information includes at least one of a basic service set identifier, a station identifier, and an access category.

\* \* \* \* \*